United States Patent
Kalhan

(10) Patent No.: US 11,121,761 B2
(45) Date of Patent: Sep. 14, 2021

(54) SYSTEM AND METHOD FOR MULTIUSER PACKETS TRANSMISSIONS FOR RELAYS

(71) Applicants: Amit Kalhan, San Diego, CA (US); Kyocera Corporation, Kyoto (JP)

(72) Inventor: Amit Kalhan, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 16/079,720

(22) PCT Filed: Mar. 17, 2017

(86) PCT No.: PCT/US2017/022963
§ 371 (c)(1),
(2) Date: Aug. 24, 2018

(87) PCT Pub. No.: WO2017/161265
PCT Pub. Date: Sep. 21, 2017

(65) Prior Publication Data
US 2019/0028179 A1 Jan. 24, 2019

Related U.S. Application Data

(60) Provisional application No. 62/310,514, filed on Mar. 18, 2016.

(51) Int. Cl.
*H04B 7/155* (2006.01)
*H04L 1/00* (2006.01)
*H04W 28/02* (2009.01)
*H04W 28/06* (2009.01)

(52) U.S. Cl.
CPC ....... *H04B 7/15521* (2013.01); *H04L 1/0061* (2013.01); *H04W 28/0236* (2013.01); *H04W 28/0268* (2013.01); *H04W 28/065* (2013.01)

(58) Field of Classification Search
CPC ............ H04B 7/15521; H04L 1/0061; H04W 28/0236; H04W 28/0268; H04W 28/065
See application file for complete search history.

(56) References Cited

U.S. PATENT DOCUMENTS

| | | |
|---|---|---|
| 2006/0031671 A1* | 2/2006 | Schmit .................. G08B 25/10 713/160 |
| 2006/0116077 A1 | 6/2006 | Liu et al. |
| 2010/0246474 A1 | 9/2010 | Zhang et al. |
| 2012/0044858 A1 | 2/2012 | Li et al. |
| 2012/0140796 A1 | 6/2012 | Dai et al. |
| 2014/0169261 A1 | 6/2014 | Ming et al. |
| 2015/0249468 A1* | 9/2015 | Nikkila ................. G10L 19/008 714/746 |

* cited by examiner

*Primary Examiner* — Walter J Divito

(57) ABSTRACT

An origination device (e.g., a base station) combines and encodes first user data and second user data, having similar QoS requirements, to generate a multiuser packet. In some cases, the origination device dual-encodes the multiuser packet. The multiuser packet is transmitted to one or more signal forwarding devices that each serve at least one of the users associated with the data contained in the multiuser packet. The signal forwarding device decodes the multiuser packet to obtain the first and second user data. The signal forwarding device transmits at least one portion of the multiuser packet, as single-encoded signals, to one or more appropriate destination devices (e.g., UE devices).

13 Claims, 5 Drawing Sheets

SYSTEM AND METHOD FOR MULTIUSER PACKETS TRANSMISSIONS FOR RELAYS

CLAIM OF PRIORITY

The present application claims priority to Provisional Application No. 62/310,514, entitled "SYSTEM, METHOD AND APPARATUS FOR MULTIUSER PACKETS TRANSMISSIONS FOR RELAYS," filed Mar. 18, 2016, assigned to the assignee hereof and hereby expressly incorporated by reference in its entirety.

FIELD

This invention generally relates to wireless communications and more particularly to transmitting multiuser packets via signal forwarding devices.

BACKGROUND

Some communication systems utilize a signal forwarding device, such as a repeater station, relay station or a self-backhauled station to facilitate the transfer of information between user equipment (UE) devices and a core network. The signal forwarding device is typically not connected directly to the core network but still provides service to the UE devices by forwarding information to and from the UE devices and a base station, which is connected to the core network. Where the signal forwarding device is a repeater, the repeater simply retransmits downlink signals received from another base station to the UE device and retransmits uplink signals received from the UE device to the other base station. Although the repeater may apply limited signal processing to the incoming signal such as filtering, frequency shifting, and amplification, a repeater will not decode the incoming signal that is to be forwarded. Relay stations and self-backhaul stations perform at least some signal processing before retransmitting the information. Such processing can vary from partial decoding to complete decoding of the incoming signal. For example, the incoming signal can be completely decoded and used to generate a new signal or the incoming signal may not be completely decoded but still used to transmit the forwarded outgoing signal. Some of the various levels of processing (forwarding techniques) are sometimes referred to as amplify and forward (AF), partial decoding and forward (PDF), and decode and forward (DF) schemes.

SUMMARY

An origination device (e.g., a base station) combines and encodes first user data and second user data, having similar QoS requirements, to generate a multiuser packet. In some cases, the origination device dual-encodes the multiuser packet. The multiuser packet is transmitted to one or more signal forwarding devices that each serve at least one of the users associated with the data contained in the multiuser packet. The signal forwarding device decodes the multiuser packet to obtain the first and second user data. The signal forwarding device transmits at least one portion of the multiuser packet, as single-encoded signals, to one or more appropriate destination devices (e.g., UE devices).

DETAILED DESCRIPTION

Figure 1A:
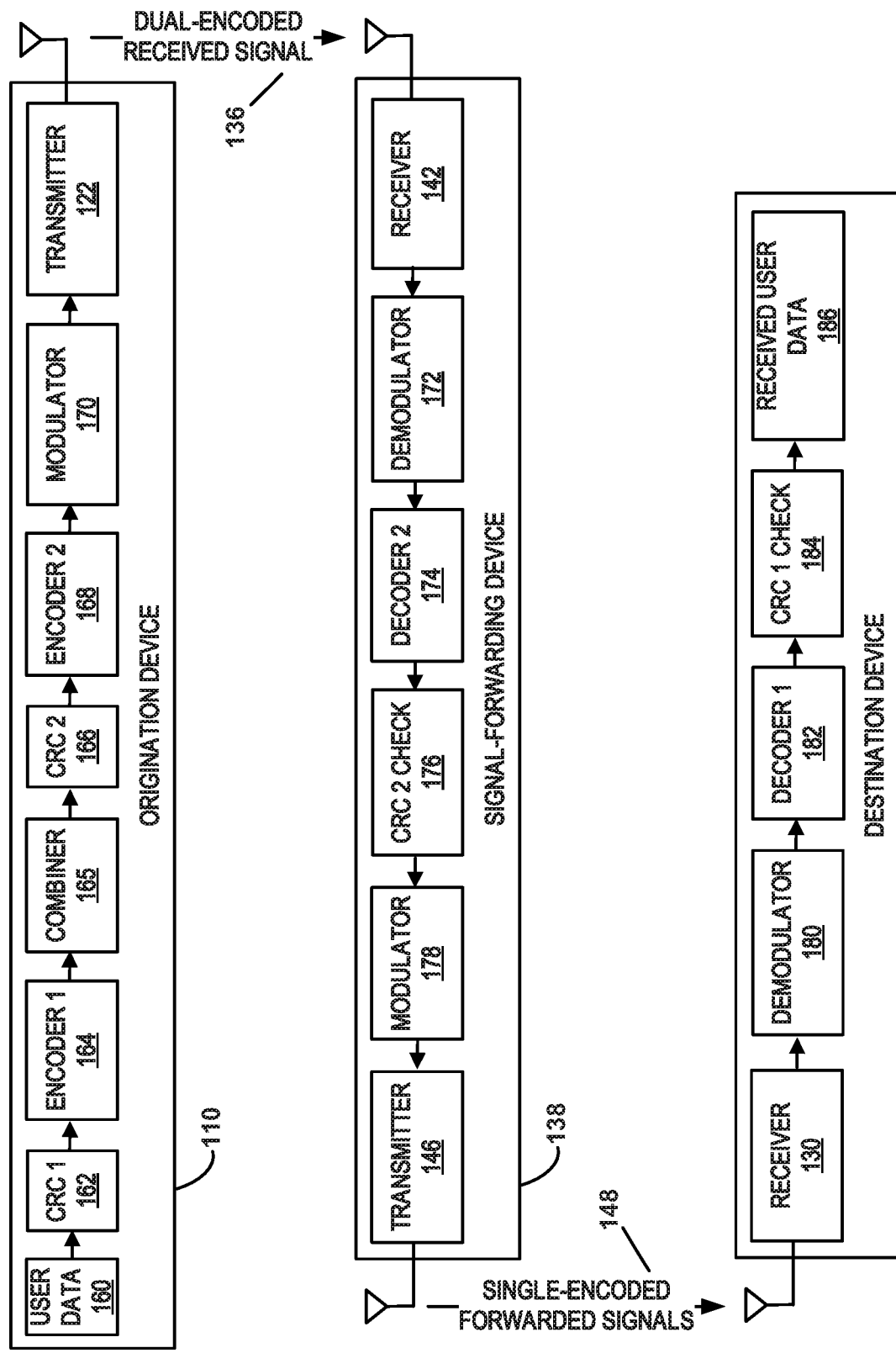
FIG. 1A is a block diagram of an example of the circuitry utilized within a dual-encoding origination device, a signal forwarding device, and a destination device to transmit dual-encoded multiuser packets.

As discussed above, communication systems often employ repeaters, relays and self-backhauled base stations to forward signals transmitted between base stations and the UE devices served by the base stations. Signals may be forwarded from the base station to the UE device, from the UE device to the base station, or both. In some systems, scheduling of communication resources for the communication channel between the signal forwarding device (e.g., repeater, relay, etc.) and the UE device is performed by a scheduler at the base station or a central scheduler connected to the base station. In the examples discussed herein, it is assumed that the scheduler is located at, or connected to, a base station to/from which the signal forwarding device forwards signals. However, the scheduler may not be physically located at the base station and may be located at any other suitable location (e.g., at the signal forwarding device or elsewhere in the radio access network to which the base station belongs).

In a typical relay scenario, an anchor base station would encode data for a single user and transmit the encoded data to a relay node. Upon receipt of the transmission from the base station, the relay node would decode the data and subsequently encode the data using encoding parameters that are appropriate for the channel conditions between the relay and the destination device (e.g., UE device) associated with the single user. In a multi-hop scenario such as the typical relay scenario, each hop causes additional delay as the data packet is transmitted and retransmitted by nodes at each layer. In delay-sensitive applications, such delay is not acceptable. Furthermore, the retransmission of each packet for each user individually increases the control-information overhead (e.g., packet size, user ID, etc.). Thus, it is desirable to reduce the control-information overhead associated with transmitting and retransmitting each packet for each user separately in a multi-hop system. For the examples discussed herein, various methods, devices, and systems will be described in which multiuser packets, containing data associated with multiple users, are utilized to minimize the control-information overhead required to transmit data for multiple users in a multi-hop scenario. Another drawback of a typical relay scenario is the additional processing delay experienced at the relay while the relay encodes the data before transmitting the data to the destination device. Therefore, in some examples discussed herein, the anchor base station dual-encodes the multiuser packet so that no encoding is required by the signal forwarding device (e.g., relay).

Since the signal forwarding device is central to the examples, the nomenclature used throughout the description centers on the signal forwarding device. More specifically, an "origination device" is a device from which a signal is transmitted to the signal forwarding device, and the signal being received at the signal forwarding device from an origination device is referred to as a "received signal." Similarly, a "destination device" is a device to which the signal forwarding device transmits a signal, which is referred to herein as a "forwarded signal." Moreover, although most of the following examples refer to a base station as the "origination device" and to a UE device as the "destination device," the examples may be modified so that the UE device is the "origination device," and the base station is the "destination device."

Before transmitting the multiuser packets to the signal forwarding device (e.g., relay, repeater, etc.), several steps are performed by various system components to prepare for combining data associated with multiple users into multiuser packets. For example, the signal forwarding device identifies the Quality of Service (QoS) requirements for one or more of the users associated with the destination devices (e.g., UE devices) it is currently serving and reports the identified QoS requirements to the origination device (e.g., base station). This reporting of QoS requirements is performed whenever a new service is established, and in some cases, the origination device may already be aware of the QoS required by a particular user. The origination device groups the users, based on the QoS requirements (e.g., delay-limits) of each user, and generates multiuser packets by bundling the data of those users that belong to the same, or similar, QoS group. The origination device adds a header to each multiuser packet, indicating the user IDs of the users that have data included in that particular multiuser packet, before sending the multiuser packet to the physical layer. The origination device performs physical layer processing on the multiuser packet by treating the multiuser packet as one transport block (or two transport blocks if the multiuser packet is too big) and transmits the multiuser packet to the signal forwarding device.

In most of the examples described herein, the signal forwarding device receives the multiuser packet, demodulates, and decodes the whole multiuser packet. After decoding the multiuser packet, the signal forwarding device reads the header to identify the data belonging to different users, extracts each data, and transmits the correct data individually to the corresponding users identified in the header. In other examples, the signal forwarding device simply retransmits the whole multiuser packet without decoding. This approach is applicable for repeater-type relays. In this case, the decoding is performed at the destination device, and thus, each of the destination devices has to demodulate and decode the multiuser packets by reading the headers and extracting data contained within the multiuser packet that is addressed to them, respectively.

There are at least two different scenarios for selecting which user data will be bundled together when creating the multiuser packets. For example, when bundling, the origination device takes packets for multiple users, combines the packets together, and transmits the combined packets in a single-time slot using a multiuser packet. These combined packets may belong to users served by different relays (e.g., Scenario A) or by a single relay (e.g., Scenario B). In Scenario A, the data belonging to different users served by different relays is bundled together in one multiuser packet, given that the channel conditions between the origination device and a first signal forwarding device are similar to the channel conditions between the origination device and a second signal forwarding device. For example, in a situation where a first user is being served by a first signal forwarding device and a second user is being served by a second signal forwarding device, a multiuser packet containing data for both the first user and the second user is transmitted to (1) the first signal forwarding device that serves a first destination device associated with the first user, and (2) the second signal forwarding device that serves a second destination device associated with the second user. The first signal forwarding device decodes the multiuser packet to obtain the first data, which is associated with the first user, and transmits the first data to the first destination device. Likewise, the second signal forwarding device decodes the multiuser packet to obtain the second data, which is associated with the second user, and transmits the second data to the second destination device. Thus, in this scenario, the origination device simply broadcasts the multiuser packet, and the first and second signal forwarding devices both demodulate and decode the whole received multiuser packet, extract the relevant data, and transmit the relevant data to their respective users. In most deployments, the channel conditions between the origination devices and the signal forwarding devices are fixed and robust due to sufficient availability of transmit power and processing power, both at the transmitter and the receiver (e.g., most have line-of-sight, allowing multi-antenna transmit-diversity transmission schemes).

In scenario B, the origination device transmits different multiuser packets containing the data for those users served by each signal forwarding device in dedicated transmissions towards each signal forwarding device. For example, in a situation where a first user and a second user are both being served by the same signal forwarding device, a multiuser packet containing data for both the first user and the second user is transmitted to the signal forwarding device that serves (1) a first destination device associated with the first user, and (2) a second destination device associated with the second user. The signal forwarding device decodes the multiuser packet to obtain the first data, which is associated with the first user, and the second data, which is associated with the second user. The signal forwarding device transmits the first data to the first destination device and the second data to the second destination device. Thus, in this scenario, the origination device simply transmits the multiuser packet to the signal forwarding device, and the signal forwarding device demodulates and decodes the whole received multiuser packet, extracts the relevant data, and transmits the relevant data to their respective users.

FIG. 1A is a block diagram of an example of the circuitry utilized within a dual-encoding origination device, a signal forwarding device, and a destination device to transmit multiuser packets. For example, the various blocks shown in FIG. 1A represent circuitry that is configured to perform various functions and processes described herein. Although each function is shown as a separate box, the circuitry that actually performs the recited functions for each box may be configured to perform the functions for multiple boxes. For example, a controller within the origination device, the signal forwarding device, and/or the destination device may be the circuitry that is configured to perform one or more of the functions shown in FIG. 1A.

The origination device 110 and destination device 114 may be any kind of wireless communication devices and may be stationary or portable. For the examples discussed herein, the origination device 110 is a base station, and the destination device 114 is a user equipment (UE) device such as a handset. However, the devices 110, 114 may be different types of devices in other circumstances. For example, both devices may be UE devices. In some situations, the origination device, the signal forwarding device, and the destination device are all UE devices. In still other situations, the origination device 110 is a UE device, and the destination device 114 is a base station.

In the example of FIG. 1A, origination device 110 provides downlink wireless communication service to destination device 114. Thus, destination device 114 receives downlink signals from origination device 110, either directly or via signal forwarding device 138. In the example of FIG. 1A, origination device 110 transmits a dual-encoded multiuser packet to signal forwarding device 138, and signal forwarding device 138 forwards a single-encoded data signal to the destination device 114.

For example, origination device 110 either generates the user data 160 or receives the user data 160 from another entity within the radio access network. In the example shown in FIG. 1A, the user data 160 includes first user data associated with a first user and second user data associated with a second user. Although only user data associated with two users is shown in this example, additional user data associated with additional users may be utilized when generating the multiuser packets. The origination device 110 has circuitry configured to add a first cyclic redundancy check value (CRC 1) 162 to the first user data and to the second user data, respectively. The CRC is an error-detecting code that is used to detect if the received packet at the receiver is in error or not. Although the examples shown herein utilize CRC, any suitable error-detection techniques may be used.

After adding CRC 1, the first user data and the second user data are encoded by Encoder 1, 164, respectively. Encoder 1 encodes the first user data according to a first set of encoding parameters corresponding to channel conditions associated with a first communication link between the signal forwarding device 138 and a first destination device associated with the first user. The first set of encoding parameters comprises a first encoding technique and/or a first encoding rate. Encoder 1 encodes the second user data according to a second set of encoding parameters corresponding to channel conditions associated with a second communication link between the signal forwarding device 138 and a second destination device associated with the second user. The second set of encoding parameters comprises a second encoding technique and/or a second encoding rate.

In the example shown in FIG. 1A, combiner 165 combines the encoded first and second user data, resulting in a single-encoded data block. However, as mentioned above, any number of additional encoded user data may be included in the single-encoded data block, in other examples. A second CRC value (CRC 2) 166 is added to the single-encoded data block. Although a CRC is used for CRC 2, any suitable alternative error-detection technique may be used in place of CRC 2. At this stage, the origination device 110 also adds a header to the single-encoded data block. The header indicates the user IDs of the users (e.g., first and second user) that have data included in the multiuser packet being generated.

The single-encoded data block, along with the header and CRC 2, is encoded by Encoder 2, 168, which, in the example shown in FIG. 1A, utilizes a non-iterative type encoding/decoding (e.g., Reed-Solomon Codes) to ensure low-latency processing at the signal forwarding device 138. Encoder 2 encodes the single-encoded data block according to a third set of encoding parameters corresponding to channel conditions associated with a third communication link between the origination device 110 and the signal forwarding device 138. The third set of encoding parameters comprises a third encoding technique and/or a third encoding rate. The result of encoding the single-encoded data block with Encoder 2 is a dual-encoded multiuser packet.

One of the advantages of dual-encoding the data is that the encoding parameters selected for each stage of encoding can be selected based on the channel conditions for a particular communication link. For example, Encoder 1 may encode the first and second user data according to an encoding technique that is better suited for transmissions between a signal forwarding device and a destination device (e.g., mobile UE device). The encoding technique utilized by Encoder 1 may, in some examples, be the same, or different, when encoding the first and second user data, depending on the respective channel conditions between each signal forwarding device and the destination devices associated with the first and second users.

Encoder 2 may encode the single-encoded data block according to a third encoding technique that is better suited for transmissions between an origination device (e.g., base station) and a signal forwarding device. For example, the first and second encoding techniques may utilize a convolutional coding, which is better suited for transmissions between a signal forwarding device and a destination device, and the third encoding technique may be a turbo coding or rate-less channel coding using the Low Density Parity Codes (LDPC), which is better suited for transmissions between an origination device and a signal forwarding device. However, any of the channel coding techniques may be used for the origination device-to-signal forwarding device channels or the signal forwarding device-to-destination device channels.

Similarly, Encoder 1 may encode the first and second user data at a coding rate that is better suited for transmissions between a signal forwarding device and a destination device (e.g., mobile UE device), and Encoder 2 may encode the single-encoded data block at a different coding rate that is better suited for transmissions between an origination device (e.g., base station) and a signal forwarding device. More specifically, the first and second user data may be encoded at a ⅓ coding rate to obtain the single-encoded first and second user data, and the single-encoded data block may be encoded at a ⅔ coding rate to obtain the dual-encoded multiuser packet, for example.

Regardless of the particular encoding parameters used, the dual-encoded multiuser packet is modulated by modulator 170 of origination device 110. In the example shown in FIG. 1A, Quadrature Amplitude Modulation (QAM) is used. However, any other suitable modulation scheme may be used. Moreover, the modulation scheme utilized by modulator 170 may also be selected based on the channel conditions between the origination device 110 and the signal forwarding device 138. The modulation of the dual-encoded multiuser packet yields a dual-encoded received signal 136.

Origination device 110 utilizes transmitter 122 to transmit the dual-encoded received signal 136 to signal forwarding device 138, which receives the transmission via receiver 142. The demodulator 172 of signal forwarding device 138 demodulates the dual-encoded received signal 136 using a demodulation scheme that corresponds to the modulation scheme utilized by modulator 170. The demodulation of the dual-encoded received signal 136 yields the dual-encoded multiuser packet.

The Decoder 2, 174, decodes the dual-encoded multiuser packet, using decoding parameters that correspond to the third set of encoding parameters, which were used by Encoder 2, 168, of the origination device 110 to encode the single-encoded data block. The result of decoding the dual-encoded multiuser packet with Decoder 2 is the single-encoded first and second user data, which are encoded according to the first and second sets of encoding parameters, respectively.

After decoding, the second CRC value (CRC 2), which was added to the single-encoded data block by the origination device 110, is checked by CRC 2 Check 176, which detects whether any errors are present in the single-encoded data block after decoding. If the CRC 2 Check 176 detects an error, signal forwarding device 138 can send a negative acknowledgment response (NACK) to the origination device 110, indicating that the dual-encoded received signal 136 was not successfully received. If the CRC 2 Check 176 does not detect an error, signal forwarding device 138 can send a positive acknowledgment response (ACK) to the origination device 110, indicating that the dual-encoded received signal 136 was successfully received.

If there are no errors, signal forwarding device 138 extracts the user data associated with any users identified in the multiuser packet header that the signal forwarding device 138 currently serves or is predicted to serve in the relatively near future. The signal forwarding device 138 discards the user data that is not associated with any of the users being served, or that will be served, by the signal forwarding device 138. In other examples, the signal forwarding device 138 may be serving either the first or the second user, or may be serving neither. However, in this example, it is assumed that the signal forwarding device 138 is currently serving both the first user and the second user. Thus, the signal forwarding device 138 extracts the first and second user data from the single-encoded data block.

Modulator 178 of signal forwarding device 138 modulates the first user data. In the example shown in FIG. 1A, Quadrature Amplitude Modulation (QAM) is used by modulator 178. However, any other suitable modulation scheme may be used. Moreover, the modulation scheme utilized by modulator 178 may also be selected based on the channel conditions between the signal forwarding device 138 and the destination device associated with the first user. The modulation of the first user data yields a single-encoded forwarded signal 148. Modulator 178 also modulates the second user data to generate another single-encoded forwarded signal.

Signal forwarding device 138 utilizes transmitter 146 to transmit the first single-encoded forwarded signal 148 to the destination device associated with the first user, which receives the transmission via a receiver 130. Similarly, signal forwarding device 138 utilizes transmitter 146 to transmit the second single-encoded forwarded signal 148 to the destination device associated with the second user, which receives the transmission via a receiver 130. The demodulator 180 of each destination device demodulates the single-encoded forwarded signals, respectively, using a demodulation scheme that corresponds to the modulation scheme utilized by modulator 178. The demodulation of the first single-encoded forwarded signal 148 yields the single-encoded first user data contained in the first single-encoded forwarded signal 148. The demodulation of the second single-encoded forwarded signal 148 yields the single-encoded second user data contained in the second single-encoded forwarded signal 148.

Likewise, the Decoder 1, 182, of each destination device decodes the single-encoded user data, respectively, using decoding parameters that correspond to the first and second set of encoding parameters, which were used by Encoder 1, 164, of the origination device 110 to encode the first and second user data, respectively. The result of decoding the single-encoded first user data with Decoder 1, using decoding parameters that correspond to the first set of encoding parameters, is the first user data. The result of decoding the single-encoded second user data with Decoder 1, using decoding parameters that correspond to the second set of encoding parameters, is the second user data. After decoding, the first CRC value (CRC 1), which was added to the user data by the origination device 110, is checked by CRC 1 Check 184, which detects whether any errors are present in the user data after decoding.

If the CRC 1 Check 184 does not detect an error, each destination device 114 can send a positive acknowledgment response (ACK) to the signal forwarding device 138 and/or the origination device 110, indicating that the single-encoded forwarded signal 148 was successfully received. If the destination device 114 sends an ACK to the origination device 110, the ACK can be sent either directly to the origination device 110 or to the origination device 110 via signal forwarding device 138. If there are no errors detected by CRC 1 Check 184, destination device 114 has successfully received and decoded the user data associated with that particular destination device (e.g., received user data 186).

Thus, by dual-encoding the user data at origination device 110 with first (or second) and third sets of encoding parameters that are selected based on the channel conditions associated with (1) the communication link between the signal forwarding device 138 and the destination device 114, and (2) the communication link between the origination device 110 and the signal forwarding device 138, respectively, a more robust data delivery system is created.

However, if the CRC 1 Check 184 detects an error, destination device 114 sends a negative acknowledgment response (NACK) to the signal forwarding device 138 and/or the origination device 110, indicating that the single-encoded forwarded signal 148 was not successfully received. The NACK is considered, for this example, to be a request for retransmission, which will be transmitted by either the origination device 110 or the signal forwarding device 138.

Figure 1B:
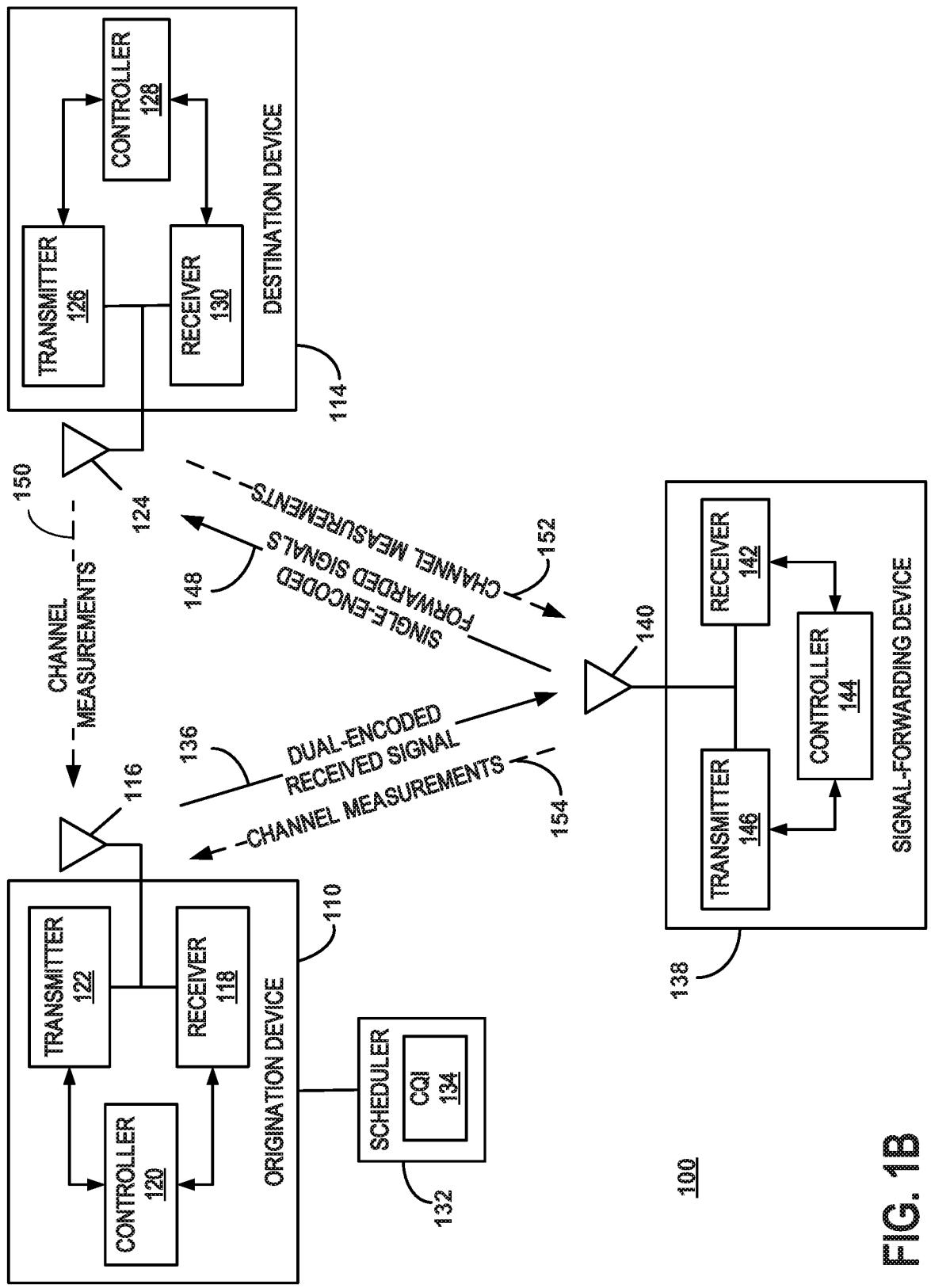
FIG. 1B is a block diagram of an example of a wireless communication system including an origination device, a signal forwarding device, and a destination device.

FIG. 1B is a block diagram of an example of a wireless communication system 100 including an origination device, a signal forwarding device, and a destination device. Although, the system 100 only shows one signal forwarding device and only one destination device, the system 100 may include multiple signal forwarding devices that each serve one or more destination devices. The origination device 110 and destination device 114 may be any kind of wireless communication devices and may be stationary or portable. For the examples discussed herein, the origination device 110 is a base station, and the destination device 114 is a user equipment (UE) device such as a handset. However, the devices 110, 114 may be different types of devices in other circumstances. For example, both devices may be UE devices. In some situations, the origination device, the signal forwarding device, and the destination device are all UE devices. In still other situations, the origination device 110 is a UE device, and the destination device 114 is a base station.

In the example of FIG. 1B, origination device 110 provides downlink wireless communication service to destination device 114. Thus, destination device 114 receives downlink signals (not shown) from origination device 110, either directly or via signal forwarding device 138. The downlink signals are received at the destination device 114 through antenna 124 and receiver 130. Destination device 114 further comprises a controller 128 and a transmitter 126. Origination device 110 transmits the downlink signals to destination device 114 and to signal forwarding device 138 via antenna 116 and transmitter 122.

Origination device 110 further comprises controller 120 and transmitter 122, as well as other electronics, hardware, and code. The origination device 110 is any fixed, mobile, or portable equipment that performs the functions described herein. The various functions and operations of the blocks described with reference to the origination device 110 may be implemented in any number of devices, circuits, or elements. Two or more of the functional blocks may be integrated in a single device, and the functions described as performed in any single device may be implemented over several devices.

For the example shown in FIG. 1B, the origination device 110 may be a fixed device or apparatus that is installed at a particular location at the time of system deployment. Examples of such equipment include fixed base stations or fixed transceiver stations. In some situations, the origination device 110 may be mobile equipment that is temporarily installed at a particular location. Some examples of such equipment include mobile transceiver stations that may include power generating equipment such as electric generators, solar panels, and/or batteries. Larger and heavier versions of such equipment may be transported by trailer. In still other situations, the origination device 110 may be a portable device that is not fixed to any particular location. Accordingly, the origination device 110 may be a portable user device such as a UE device in some circumstances.

The controller 120 includes any combination of hardware, software, and/or firmware for executing the functions described herein as well as facilitating the overall functionality of the origination device 110. An example of a suitable controller 120 includes code running on a microprocessor or processor arrangement connected to memory. The transmitter 122 includes electronics configured to transmit wireless signals. In some situations, the transmitter 122 may include multiple transmitters. The receiver 118 includes electronics configured to receive wireless signals. In some situations, the receiver 118 may include multiple receivers. The receiver 118 and transmitter 122 receive and transmit signals, respectively, through an antenna 116. The antenna 116 may include separate transmit and receive antennas. In some circumstances, the antenna 116 may include multiple transmit and receive antennas.

The transmitter 122 and receiver 118 in the example of FIG. 1B perform radio frequency (RF) processing including modulation and demodulation. The receiver 118, therefore, may include components such as low noise amplifiers (LNAs) and filters. The transmitter 122 may include filters and amplifiers. Other components may include isolators, matching circuits, and other RF components. These components in combination or cooperation with other components perform the origination device functions. The required components may depend on the particular functionality required by the origination device.

The transmitter 122 includes modulator 170 (shown in FIG. 1A), and the receiver 118 includes a demodulator (not shown). The modulator 170 modulates the signals to be transmitted as part of the dual-encoded received signal 136 and can apply any one of a plurality of modulation orders. The demodulator demodulates any signals received at the origination device 110 in accordance with one of a plurality of modulation orders.

Scheduler 132 is located at origination device 110 in the example shown in FIG. 1B. However, the system 100 could be modified so that the scheduler 132 is located at any other suitable location. Regardless of the location of scheduler 132, the system 100 may be configured so that multiple entities within the radio access network (e.g., different origination devices, different signal forwarding devices, and different destination devices) can access the scheduler 132. For example, in an ad-hoc topology, a first origination device can access the scheduler 132 and transmit a dual-encoded received signal to the signal forwarding device at a given time, but a second origination device can access the scheduler 132 and transmit a dual-encoded received signal to the signal forwarding device at a second, different time.

The scheduler may be an application running on equipment connected directly to origination device 110 or connected through a backhaul or other communication link. Regardless of the location of scheduler 132, channel quality information (CQI) 134 regarding the various communication links within the system 100 is provided to scheduler 132, which uses the CQI 134 to schedule communication resources to be used by the various entities within the system 100. For the example shown in FIG. 1B, the scheduler 132 utilizes CQI pertaining to the communication link between the origination device 110 and the destination device 114, CQI pertaining to the communication link between the origination device 110 and the signal forwarding device 138, and CQI pertaining to the communication link between the signal forwarding device 138 and the destination device 114. Based on the channel quality for at least one of these three communication links, the scheduler 132 schedules communication resources.

As discussed above, origination device 110 of FIG. 1B transmits a dual-encoded received signal 136 (e.g. a downlink signal) to the signal forwarding device 138, which receives the dual-encoded received signal 136 via antenna 140 and receiver 142. The signal forwarding device 138 further comprises controller 144 and transmitter 146, as well as other electronics, hardware, and code. The signal forwarding device 138 is any fixed, mobile, or portable equipment that performs the functions described herein. The various functions and operations of the blocks described with reference to the signal forwarding device 138 may be implemented in any number of devices, circuits, or elements. Two or more of the functional blocks may be integrated in a single device, and the functions described as performed in any single device may be implemented over several devices.

For the example shown in FIG. 1B, the signal forwarding device 138 may be a fixed device or apparatus that is installed at a particular location at the time of system deployment. Examples of such equipment include fixed base stations or fixed transceiver stations. In some situations, the signal forwarding device 138 may be mobile equipment that is temporarily installed at a particular location. Some examples of such equipment include mobile transceiver stations that may include power generating equipment such as electric generators, solar panels, and/or batteries. Larger and heavier versions of such equipment may be transported by trailer.

In still other situations, the signal forwarding device 138 may be a portable device that is not fixed to any particular location. Accordingly, the signal forwarding device 138 may be a portable user device such as a UE device in some circumstances. In some implementations, the signal forwarding device 138 may be a base station, eNB, or access point that performs signal forwarding functions in addition to serving UE devices. For example, a self-backhauled eNB, connected to an anchor eNB, may be configured to perform signal forwarding functions for some UE devices in addition to directly serving other UE devices utilizing the wireless backhaul to the origination device 110 (e.g., anchor eNB). In other implementations, the signal forwarding device 138 may be a drone with cellular capability. Such a drone can easily move about towards locations where the existing coverage from fixed base stations is lacking.

The controller 144 includes any combination of hardware, software, and/or firmware for executing the functions described herein as well as facilitating the overall functionality of the signal forwarding device 138. An example of a suitable controller 144 includes code running on a microprocessor or processor arrangement connected to memory. The transmitter 146 includes electronics configured to transmit wireless signals. In some situations, the transmitter 146 may include multiple transmitters. The receiver 142 includes electronics configured to receive wireless signals. In some situations, the receiver 142 may include multiple receivers. The receiver 142 and transmitter 146 receive and transmit signals, respectively, through an antenna 140. The antenna 140 may include separate transmit and receive antennas. In some circumstances, the antenna 140 may include multiple transmit and receive antennas.

The transmitter 146 and receiver 142 in the example of FIG. 1B perform radio frequency (RF) processing including modulation and demodulation. The receiver 142, therefore, may include components such as low noise amplifiers (LNAs) and filters. The transmitter 146 may include filters and amplifiers. Other components may include isolators, matching circuits, and other RF components. These components in combination or cooperation with other components perform the signal forwarding functions. The required components may depend on the particular signal forwarding scheme that is employed.

The transmitter 146 includes modulator 178 (shown in FIG. 1A), and the receiver 142 includes demodulator 172 (shown in FIG. 1A). The modulator modulates the signals to be transmitted as part of the single-encoded forwarded signal 148 and can apply any one of a plurality of modulation orders. The demodulator demodulates the dual-encoded received signal 136 in accordance with one of a plurality of modulation orders. The modulation order for transmissions to the destination device 114, however, is established by scheduler 132.

As is known, the modulation order determines the number of bits used to generate the modulated symbol. There is a trade-off between modulation order, required energy, and bit-error rate (BER). As the modulation order is increased, the average energy per bit must also be increased to maintain the same BER. In the example shown in FIG. 1B, the signal forwarding device 138 utilizes a lower-order modulation symbol to modulate the single-encoded data packets before transmitting the single-encoded forwarded signal 148. This scenario occurs because a typical link between the signal forwarding device 138 and the destination device 114 has a relatively lower signal-to-noise ratio (SNR) compared to the link between the origination device 110 and the signal forwarding device 138. In some situations, for example, the origination device-to-signal forwarding device (OD-SFD) channel between the origination device 110 and the signal forwarding device 138 is typically static because both devices are fixed, whereas the signal forwarding device-to-destination device (SFD-DD) channel between the signal forwarding device 138 and the destination device 114 is generally dynamic because the destination device 114 is mobile. Accordingly, the origination device 110 may utilize a higher-order modulation order when the communication link between the origination device 110 and the signal forwarding device 138 is static, which yields a relatively higher SNR compared to the communication link between the signal forwarding device 138 and the destination device 114.

As described above, the signal forwarding device 138 receives the dual-encoded received signal 136 with antenna 140 and receiver 142. The signal forwarding device 138 demodulates the dual-encoded received signal 136 with demodulator 172 of FIG. 1A, which yields the dual-encoded multiuser packet. The dual-encoded multiuser packet is decoded with Decoder 2, 174, of FIG. 1A, which yields a single-encoded data block.

Upon successful decoding by Decoder 2, signal forwarding device 138 extracts the user data associated with any users that the signal forwarding device 138 is serving, or may serve, that are identified in the multiuser packet header. In this example, the first and second users are identified in the multiuser packet header. Thus, signal forwarding device extracts the single-encoded first and second user data from the single-encoded data block. The single-encoded first user data is modulated with modulator 178 of FIG. 1A, which yields a first single-encoded forwarded signal 148. The single-encoded second user data is modulated with modulator 178 of FIG. 1A, which yields a second single-encoded forwarded signal 148. The signal forwarding device 138 transmits the first single-encoded forwarded signal 148 via transmitter 146 and antenna 140 to the destination device associated with the first user. The signal forwarding device 138 transmits the second single-encoded forwarded signal 148 via transmitter 146 and antenna 140 to the destination device associated with the second user. In this manner, the signal forwarding device 138 transmits the single-encoded first and second user data, which is contained in the first and second single-encoded forwarded signals 148, to the destination device associated with the first user and the destination device associated with the second user, respectively. For the examples discussed herein, the single-encoded forwarded signals 148 are transmitted within a single frequency band of the SFD-DD channel. The incoming dual-encoded received signal 136 is transmitted within an origination device-to-signal forwarding device channel (OD-SFD channel), which also includes a single frequency band. However, any combination of frequency bands and frequency sub-bands may be used for the OD-SFD channel and the SFD-DD channel.

In some examples, upon receiving the dual-encoded received signal 136, the controller 144 of the signal forwarding device 138 is configured to measure the dual-encoded received signal 136 to obtain channel measurements associated with the OD-SFD channel between the origination device 110 and the signal forwarding device 138. After measuring the dual-encoded received signal 136, the transmitter 146 of the signal forwarding device 138 transmits the OD-SFD channel measurements to the origination device 110. The OD-SFD channel measurements are transmitted to origination device 110, as indicated by dashed signal line 154 in FIG. 1B. In this manner, the origination device 110, using receiver 118, receives channel feedback regarding the channel conditions associated with the communication link between the origination device 110 and the signal forwarding device 138. Of course, in other examples, the origination device 110 can also obtain its own channel measurements regarding the channel conditions associated with the communication link between the origination device 110 and the signal forwarding device 138 by measuring incoming signals from the signal forwarding device 138. After receiving the channel feedback, controller 120 of origination device 110 can modify the set of encoding parameters used by Encoder 2, 168, based on the received channel feedback regarding the channel conditions associated with the communication link between the origination device 110 and the signal forwarding device 138.

The destination device 114 receives the single-encoded forwarded signal 148 via antenna 124 and receiver 130. The destination device 114 further comprises controller 128 and transmitter 126, as well as other electronics, hardware, and code. The destination device 114 is any fixed, mobile, or portable equipment that performs the functions described herein. The various functions and operations of the blocks described with reference to the destination device 114 may be implemented in any number of devices, circuits, or elements. Two or more of the functional blocks may be integrated in a single device, and the functions described as performed in any single device may be implemented over several devices.

The controller 128 includes any combination of hardware, software, and/or firmware for executing the functions described herein as well as facilitating the overall functionality of the destination device 114. An example of a suitable controller 128 includes code running on a microprocessor or processor arrangement connected to memory. The transmitter 126 includes electronics configured to transmit wireless signals. In some situations, the transmitter 126 may include multiple transmitters. The receiver 130 includes electronics configured to receive wireless signals. In some situations, the receiver 130 may include multiple receivers. The receiver 130 and transmitter 126 receive and transmit signals, respectively, through an antenna 124. The antenna 124 may include separate transmit and receive antennas. In some circumstances, the antenna 124 may include multiple transmit and receive antennas.

The transmitter 126 and receiver 130 in the example of FIG. 1B perform radio frequency (RF) processing including modulation and demodulation. The receiver 130, therefore, may include components such as low noise amplifiers (LNAs) and filters. The transmitter 126 may include filters and amplifiers. Other components may include isolators, matching circuits, and other RF components. These components in combination or cooperation with other components perform the destination device functions. The required components may depend on the particular functionality required by the destination device.

The transmitter 126 includes a modulator (not shown), and the receiver 130 includes demodulator 180 (shown in FIG. 1A). The modulator modulates the signals to be transmitted as part of the channel measurement signals 150, 152 and can apply any one of a plurality of modulation orders. The demodulator demodulates the single-encoded forwarded signal 148 in accordance with one of a plurality of modulation orders.

As described above, the destination device 114 receives the single-encoded forwarded signal 148 with antenna 124 and receiver 130. The first destination device demodulates the first single-encoded forwarded signal 148 with demodulator 180 of FIG. 1A, which yields the single-encoded first user data. The single-encoded first user data is decoded with Decoder 1, 182, of FIG. 1A, which yields the first user data (e.g., received user data 186). The second destination device demodulates the second single-encoded forwarded signal 148 with demodulator 180 of FIG. 1A, which yields the single-encoded second user data. The single-encoded second user data is decoded with Decoder 1, 182, of FIG. 1A, which yields the second user data (e.g., received user data 186).

In some examples, upon receiving the single-encoded forwarded signal 148, the controller 128 of the destination device 114 is configured to measure the single-encoded forwarded signal 148 to obtain channel measurements associated with a signal forwarding device-to-destination device (SFD-DD) channel between the signal forwarding device 138 and the destination device 114. After measuring the single-encoded forwarded signal 148, the transmitter 126 of destination device 114 transmits the SFD-DD channel measurements to the origination device 110. The SFD-DD channel measurements can be transmitted directly to origination device 110, as indicated by dashed signal line 150 in FIG. 1B. Alternatively, the SFD-DD channel measurements can be initially transmitted to signal forwarding device 138, as indicated by dashed signal line 152, and signal forwarding device 138 can subsequently transmit the SFD-DD channel measurements to origination device 110, as indicated by dashed signal line 154. Of course, in other examples, the signal forwarding device 138 can also obtain its own channel measurements regarding the channel conditions associated with the communication link between the signal forwarding device 138 and the destination device 114 by measuring incoming signals from the destination device 114. The signal forwarding device 138 may then transmit its own channel measurements to the origination device 110. Thus, there are multiple ways in which the origination device 110, using receiver 118, can receive channel feedback regarding the channel conditions associated with the communication link between the signal forwarding devices and the destination devices. After receiving the channel feedback from the first and second destination devices, controller 120 of origination device 110 can modify the first and/or second set of encoding parameters used by Encoder 1, 164, based on the received channel feedback regarding the channel conditions associated with the communication link between the signal forwarding device 138 and the destination devices.

In some examples, destination device 114 can also transmit the SFD-DD channel measurements to origination device 110, either directly or indirectly through signal forwarding device 138, as part of a feedback signal. Alternatively, the SFD-DD channel measurements can be transmitted separately from the feedback signal. For example, the feedback signal can include a downlink channel feedback report comprising downlink channel measurements related to one or more downlink signals received by the destination device 114. For example, the downlink channel feedback report may contain downlink channel measurements for downlink signals received from the origination device 110 and/or downlink channel measurements for one or more downlink signals received from one or more base stations other than origination device 110. The downlink channel feedback report can additionally include the location of the resources (e.g., time slots, subcarriers, reference signal, etc.) on which the downlink channel measurements were made.

The downlink channel feedback report may also identify a carrier on which the downlink channel measurements were made, a cell identifier associated with origination device 110 that transmitted the downlink signals, and/or a spatial vector associated with a beamformed downlink signal. In some examples, the downlink channel feedback report may identify a cell identifier associated with a base station, other than origination device 110, that transmitted the downlink signal. This scenario might occur when the downlink signal is received from a base station other than origination device 110, but the destination device 114 needs to submit the downlink channel feedback report to the scheduler 132 located at the origination device 110.

In yet another scenario, destination device 114 can receive downlink signals from a first device (e.g., origination device 110), as the primary carrier of the downlink signals, and can also receive downlink signals from a second device (e.g., signal forwarding device 138 or a base station other than origination device 110), as the secondary carrier of the downlink signals. In such a scenario, the downlink channel feedback report may (1) identify the primary carrier and/or the secondary carrier on which the downlink channel measurements were made, (2) include a cell identifier associated with the first device that transmitted the primary carrier and/or a cell identifier associated with the second device that transmitted the secondary carrier, and/or (3) include a spatial vector associated with each of one or more beamformed downlink signals, respectively.

Alternatively, the feedback signal can include an acknowledgment response, which can be either a positive acknowledgment response (ACK) or a negative acknowledgment response (NACK). The ACK message indicates that a downlink signal was successfully received by the destination device 114. The NACK message indicates that the downlink signal was not successfully received by the destination device 114. In some situations, the ACK/NACK message is a message that is forwarded on to the origination device 110 by the signal forwarding device 138. In other situations, it a message intended for the signal forwarding device 138. In still other situations, the ACK message can be an indication to both the signal forwarding device 138 and the origination device 110. In scenarios in which the feedback signal includes an acknowledgment response, the feedback signal may additionally identify a carrier on which the downlink signal was received, a cell identifier associated with origination device 110 that transmitted the downlink signal, a cell identifier associated with a base station, other than origination device 110, that transmitted the downlink signal, and/or a spatial vector associated with a beamformed downlink signal. Regardless of the contents of the feedback signal, the SFD-DD channel measurements can be transmitted along with, or separate from, the feedback signal to the origination device 110, either directly or through signal forwarding device 138.

Figure 1C:
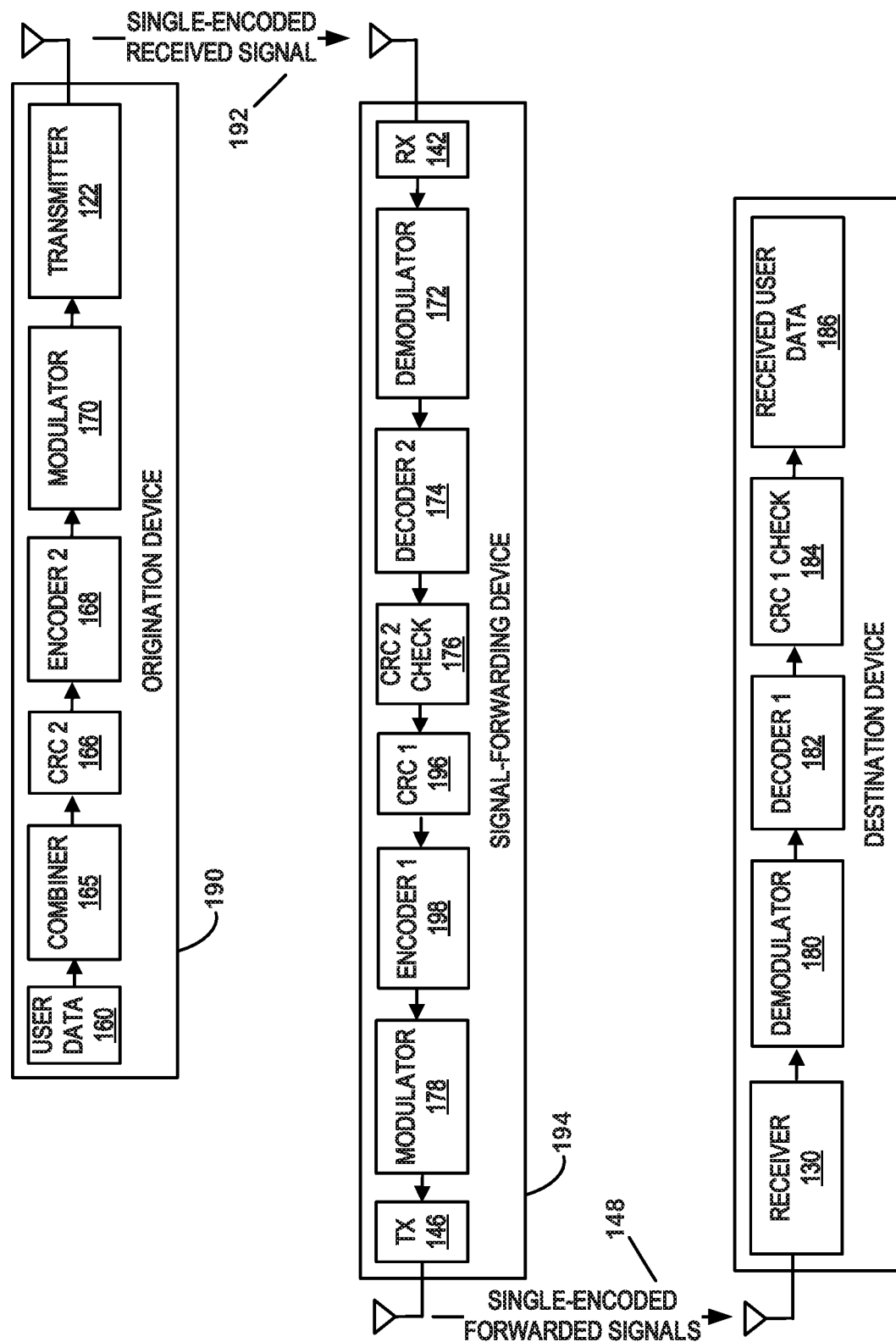
FIG. 1C is a block diagram of an example of the circuitry utilized within a single-encoding origination device, a signal forwarding device, and a destination device to transmit single-encoded multiuser packets.

FIG. 1C is a block diagram of an example of the circuitry utilized within a single-encoding origination device, a signal forwarding device, and a destination device to transmit single-encoded multiuser packets. The system shown in FIG. 1C functions similarly to the system shown in FIG. 1A. To that end, many of the components of FIG. 1C have the same name and reference character as the components in FIG. 1A. Thus, this discussion of FIG. 1C will focus on how the system of FIG. 1C is different from the system of FIG. 1A. In the interest of brevity, if a component shares the same name and reference character in FIG. 1C as in FIG. 1A, it is assumed that those components function in a manner similar to that described in conjunction with FIG. 1A, unless otherwise stated, even if the component is now found in signal forwarding device 194 of FIG. 1C instead of in origination device 110 of FIG. 1A.

The various blocks shown in FIG. 1C represent circuitry that is configured to perform various functions and processes described herein. Although each function is shown as a separate box, the circuitry that actually performs the recited functions for each box may be configured to perform the functions for multiple boxes. For example, a controller within the origination device, the signal forwarding device, and/or the destination device may be the circuitry that is configured to perform one or more of the functions shown in FIG. 1C.

In the example shown in FIG. 1C, the origination device 190 is a base station, and the destination device 114 is a user equipment (UE) device such as a handset. However, the devices 190, 114 may be different types of devices in other circumstances. For example, both devices may be UE devices. In some situations, the origination device, the signal forwarding device, and the destination device are all UE devices. In still other situations, the origination device 190 is a UE device, and the destination device 114 is a base station.

In the example of FIG. 1C, origination device 190 provides downlink wireless communication service to destination device 114. Thus, destination device 114 receives downlink signals from origination device 190, either directly or via signal forwarding device 194. In the example of FIG. 1C, origination device 190 transmits a single-encoded multiuser packet to signal forwarding device 194, and signal forwarding device 194 forwards a single-encoded data signal to the destination device 114.

For example, origination device 190 either generates the user data 160 or receives the user data 160 from another entity within the radio access network. In the example shown in FIG. 1C, the user data 160 includes first user data associated with a first user and second user data associated with a second user. Although only user data associated with two users is shown in this example, additional user data associated with additional users may be utilized when generating the multiuser packets.

In the example shown in FIG. 1C, combiner 165 combines the first and second user data. A CRC value (CRC 2) 166 is added to the combined first and second user data. Although a CRC is used for CRC 2, any suitable alternative error-detection technique may be used in place of CRC 2. At this stage, the origination device 190 also adds a header to the combined first and second user data. The header indicates the user IDs of the users (e.g., first and second user) that have data included in the multiuser packet being generated.

The combined first and second user data, along with the header and CRC 2, is encoded by Encoder 2, 168, which, in the example shown in FIG. 1C, utilizes a non-iterative type encoding/decoding (e.g., Reed-Solomon Codes) to ensure low-latency processing at the signal forwarding device 194. Encoder 2 encodes the combined first and second user data according to a first set of encoding parameters corresponding to channel conditions associated with a first communication link between the origination device 190 and the signal forwarding device 194. The first set of encoding parameters comprises a first encoding technique and/or a first encoding rate. The result of encoding the combined first and second user data with Encoder 2 is a single-encoded multiuser packet.

Encoder 2 encodes the combined first and second user data according to a first encoding technique that is better suited for transmissions between an origination device (e.g., base station) and a signal forwarding device. For example, the first encoding technique may be a turbo coding or rate-less channel coding using the Low Density Parity Codes (LDPC), which is better suited for transmissions between an origination device and a signal forwarding device. However, any of the channel coding techniques may be used for the origination device-to-signal forwarding device channels. Moreover, Encoder 2 may encode the combined first and second user data at a coding rate that is better suited for transmissions between an origination device (e.g., base station) and a signal forwarding device. For example, the combined first and second user data may be encoded at a ⅔ coding rate to obtain the single-encoded multiuser packet.

Regardless of the particular encoding parameters used, the single-encoded multiuser packet is modulated by modulator 170 of origination device 190. In the example shown in FIG. 1A, Quadrature Amplitude Modulation (QAM) is used. However, any other suitable modulation scheme may be used. Moreover, the modulation scheme utilized by modulator 170 may also be selected based on the channel conditions between the origination device 190 and the signal forwarding device 194. The modulation of the single-encoded multiuser packet yields a single-encoded received signal 192.

Origination device 190 utilizes transmitter 122 to transmit the single-encoded received signal 192 to signal forwarding device 194, which receives the transmission via receiver 142. The demodulator 172 of signal forwarding device 194 demodulates the single-encoded received signal 192 using a demodulation scheme that corresponds to the modulation scheme utilized by modulator 170. The demodulation of the single-encoded received signal 192 yields the single-encoded multiuser packet.

The Decoder 2, 174, decodes the single-encoded multiuser packet, using decoding parameters that correspond to the first set of encoding parameters, which were used by Encoder 2, 168, of the origination device 190 to encode the combined first and second user data. The result of decoding the single-encoded multiuser packet with Decoder 2 is the first and second user data.

After decoding, the second CRC value (CRC 2), which was added to the combined first and second user data by the origination device 190, is checked by CRC 2 Check 176, which detects whether any errors are present in the combined first and second user data after decoding. If the CRC 2 Check 176 detects an error, signal forwarding device 194 can send a negative acknowledgment response (NACK) to the origination device 190, indicating that the single-encoded received signal 192 was not successfully received. If the CRC 2 Check 176 does not detect an error, signal forwarding device 194 can send a positive acknowledgment response (ACK) to the origination device 190, indicating that the single-encoded received signal 192 was successfully received.

If there are no errors, signal forwarding device 194 extracts the user data associated with any users identified in the multiuser packet header that the signal forwarding device 194 currently serves or is predicted to serve in the relatively near future. The signal forwarding device 194 discards the user data that is not associated with any of the users being served, or that will be served, by the signal forwarding device 194. In other examples, the signal forwarding device 194 may be serving either the first or the second user, or may be serving neither. However, in this example, it is assumed that the signal forwarding device 194 is currently serving both the first user and the second user. Thus, the signal forwarding device 194 extracts the first and second user data from the combined first and second user data.

The signal forwarding device 194 has circuitry configured to add a first cyclic redundancy check value (CRC 1) 196 to the first user data and to the second user data, respectively. The CRC is an error-detecting code that is used to detect if the received packet at the receiver is in error or not. Although the examples shown herein utilize CRC, any suitable error-detection techniques may be used.

After adding CRC 1, the first user data and the second user data are encoded by Encoder 1, 198, respectively. Encoder 1 encodes the first user data according to a second set of encoding parameters corresponding to channel conditions associated with a second communication link between the signal forwarding device 194 and a first destination device associated with the first user. The second set of encoding parameters comprises a second encoding technique and/or a second encoding rate. Encoder 1 encodes the second user data according to a third set of encoding parameters corresponding to channel conditions associated with a third communication link between the signal forwarding device 194 and a second destination device associated with the second user. The third set of encoding parameters comprises a third encoding technique and/or a third encoding rate.

Encoder 1 may encode the first and second user data according to an encoding technique that is better suited for transmissions between a signal forwarding device and a destination device (e.g., mobile UE device). For example, Encoder 1 may utilize a convolutional coding, which is better suited for transmissions between a signal forwarding device and a destination device. However, any of the channel coding techniques may be used for the signal forwarding device-to-destination device channels. The encoding technique utilized by Encoder 1 may, in some examples, be the same, or different, when encoding the first and second user data, depending on the respective channel conditions between each signal forwarding device and the destination devices associated with the first and second users. Similarly, Encoder 1 may encode the first and second user data at a coding rate that is better suited for transmissions between a signal forwarding device and a destination device (e.g., mobile UE device). More specifically, the first and second user data may be encoded at a ⅓ coding rate to obtain the single-encoded first and second user data.

Modulator 178 of signal forwarding device 194 modulates the first user data. In the example shown in FIG. 1C, Quadrature Amplitude Modulation (QAM) is used by modulator 178. However, any other suitable modulation scheme may be used. Moreover, the modulation scheme utilized by modulator 178 may also be selected based on the channel conditions between the signal forwarding device 194 and the destination device associated with the first user. The modulation of the first user data yields a single-encoded forwarded signal 148. Modulator 178 also modulates the second user data, in a manner similar to the first user data, to generate another single-encoded forwarded signal 148.

Signal forwarding device 194 utilizes transmitter 146 to transmit the first single-encoded forwarded signal 148 to the destination device associated with the first user, which receives the transmission via a receiver 130. Similarly, signal forwarding device 194 utilizes transmitter 146 to transmit the second single-encoded forwarded signal 148 to the destination device associated with the second user, which receives the transmission via a receiver 130. The demodulator 180 of each destination device demodulates the single-encoded forwarded signals, respectively, using a demodulation scheme that corresponds to the modulation scheme utilized by modulator 178. The demodulation of the first single-encoded forwarded signal 148 yields the single-encoded first user data contained in the first single-encoded forwarded signal 148. The demodulation of the second single-encoded forwarded signal 148 yields the single-encoded second user data contained in the second single-encoded forwarded signal 148.

The Decoder 1, 182, decodes the single-encoded user data, using decoding parameters that correspond to the second or third set of encoding parameters, which were used by Encoder 1, 164, of the origination device 110 to encode the first and second user data, respectively. The result of decoding the first single-encoded user data with Decoder 1 is the first user data. The result of decoding the second single-encoded user data with Decoder 1 is the second user data. After decoding, the first CRC value (CRC 1), which was added to the user data by the origination device 110, is checked by CRC 1 Check 184, which detects whether any errors are present in the user data after decoding.

If the CRC 1 Check 184 does not detect an error, each destination device 114 can send a positive acknowledgment response (ACK) to the signal forwarding device 194 and/or the origination device 190, indicating that the single-encoded forwarded signal 148 was successfully received. If the destination device 114 sends an ACK to the origination device 190, the ACK can be sent either directly to the origination device 190 or to the origination device 190 via signal forwarding device 194. If there are no errors detected by CRC 1 Check 184, destination device 114 has successfully received and decoded the user data associated with that particular destination device (e.g., received user data 186).

However, if the CRC 1 Check 184 detects an error, destination device 114 sends a negative acknowledgment response (NACK) to the signal forwarding device 194 and/or the origination device 190, indicating that the single-encoded forwarded signal 148 was not successfully received. The NACK is considered, for this example, to be a request for retransmission, which will be transmitted by either the origination device 190 or the signal forwarding device 194.

Although the foregoing examples generally describe the origination device as a base station and the destination device as a UE device, other examples (e.g., uplink configurations) use the UE devices as origination devices and a base station as a destination device. In these instances, multiple UE devices collectively transmit user data from two or more users to a signal forwarding device. For example, the signal forwarding device combines first data associated with a first user with second data associated with a second user to generate a multiuser packet. The signal forwarding device transmits the multiuser packet to an appropriate destination device (e.g., base station). In some examples, the signal forwarding device may encode the first and second data before combining the first and second data.

More specifically, the signal forwarding device, in an uplink configuration, combines the user data, having similar QoS requirements, from multiple users to generate a multiuser packet. The signal forwarding device may, in some examples, encode the first and second data before combining the first and second data. If encoding does occur, the encoding is performed according to encoding parameters corresponding to channel conditions associated with a communication link between the signal forwarding device and the destination base station. The signal forwarding device then transmits the multiuser packet to the destination base station.

The foregoing discussion regarding uplink configurations may be applied to any of the scenarios/configurations described herein (e.g., Scenario A, Scenario B, dual-encoded multiuser packet, single-encoded multiuser packet, etc.). Moreover, although the foregoing examples specifically describe an uplink configuration, other configurations are possible. For example, user data from multiple UE devices may be combined by a signal forwarding device, which may or may not also be a UE device, and transmitted to yet another UE destination device. Similarly, user data from multiple base station origination devices may be combined at a signal forwarding device and transmitted to one or more destination UE devices.

Figure 2:
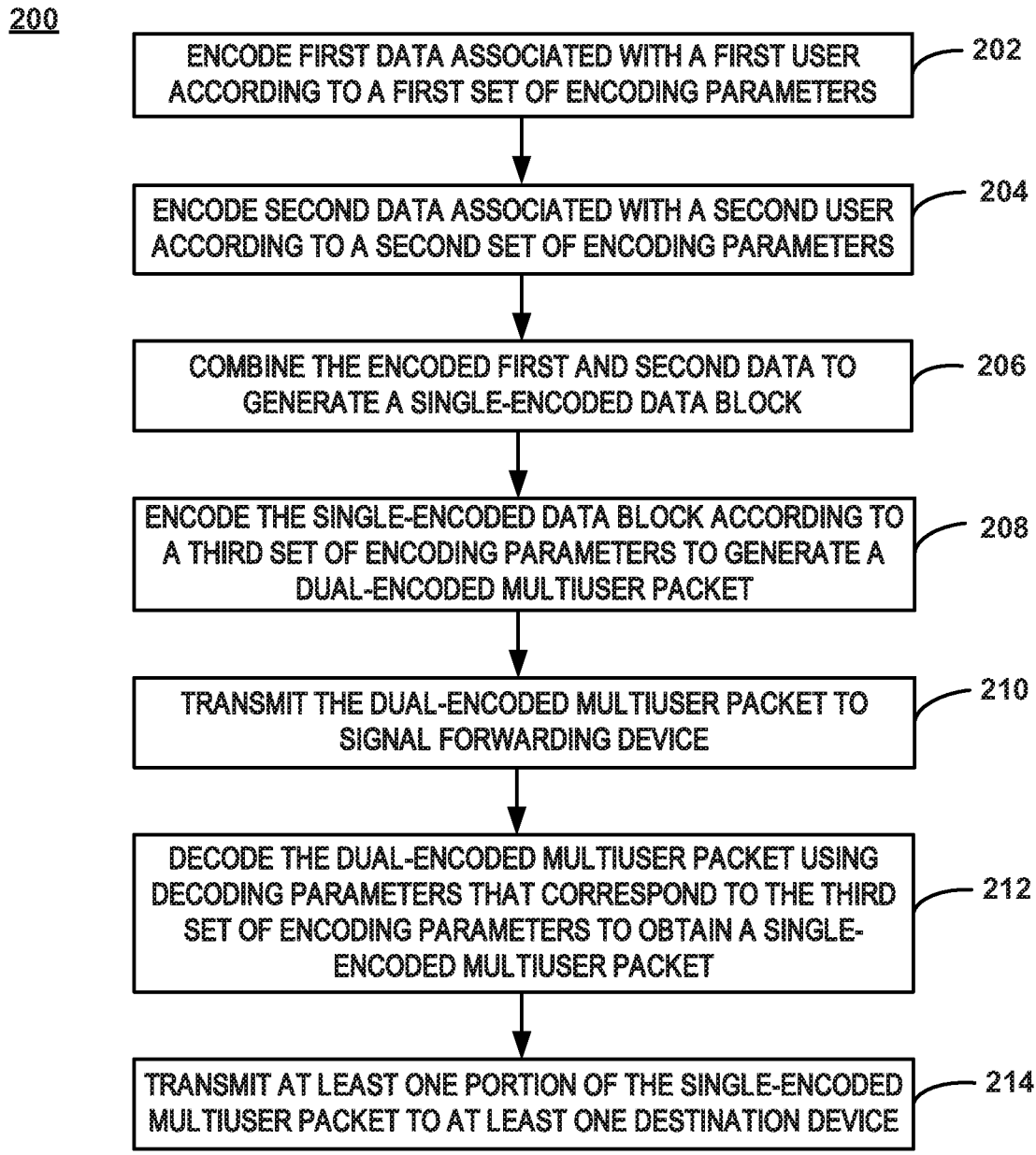
FIG. 2 is a flowchart of an example of a method of transmitting a dual-encoded multiuser packet.

FIG. 2 is a flowchart of an example of a method 200 of utilizing the wireless communication system of FIG. 1B to transmit a dual-encoded multiuser packet. The method begins, at step 202, with encoding first user data according to a first set of encoding parameters. As described above, the first set of encoding parameters corresponds to channel conditions associated with a first communication link between the signal forwarding device 138 and the destination device 114. The first set of encoding parameters may include a first encoding technique and/or a first encoding rate. At step 204, second user data is encoded according to a second set of encoding parameters. As described above, the second set of encoding parameters corresponds to channel conditions associated with a second communication link between the signal forwarding device 138 and the destination device 114. The second set of encoding parameters may include a second encoding technique and/or a second encoding rate.

At step 206, the first and second encoded user data are combined to generate a single-encoded data block. At step 208, the single-encoded data block is encoded according to a third set of encoding parameters. The third set of encoding parameters corresponds to channel conditions associated with a third communication link between the origination device 110 and the signal forwarding device 138. The third set of encoding parameters may include a third encoding technique and/or a third encoding rate. The result of step 208 is a dual-encoded multiuser packet.

At step 210, the origination device 110 transmits a dual-encoded received signal 136, which contains the dual-encoded multiuser packet, to the signal forwarding device 138. At step 212, the signal forwarding device 138 decodes the dual-encoded multiuser packet, using decoding parameters that correspond to the third set of encoding parameters, to obtain the single-encoded first and second user data that are encoded according to the first and second sets of encoding parameters, respectively. At step 214, the signal forwarding device 138 transmits a single-encoded forwarded signal 148, which contains at least one portion of the single-encoded multiuser packet to at least one destination device. For example, the signal forwarding device 138 can transmit (1) the single-encoded first user data to a destination device associated with the first user, and/or (2) the single-encoded second user data to a destination device associated with the second user.

The destination device 114 receives either the single-encoded first or second user data and attempts to decode the received user data using decoding parameters that correspond to either the first or second set of encoding parameters, respectively. If the decoding procedure is successful, the destination device 114 will have successfully received the user data and will transmit an ACK to the signal forwarding device 138 and/or the origination device 110. If the decoding procedure is unsuccessful, the destination device 114 will transmit a NACK to the signal forwarding device 138 and/or the origination device 110.

In this regard, if system 100 of FIG. 1B utilizes a Hybrid Automatic Repeat Request (HARQ) process for error-correction and error-control, each ACK/NACK transmitted from the signal forwarding device 138 and the destination device 114 may include an identifier in order to identify the device that initially transmitted the ACK/NACK. In some cases, the HARQ Process ID may also be used. When using the HARQ mechanism, the receiver and the transmitter should know some information about the Process ID for each of the HARQ processes, so that the receiver can successfully track each of the HARQ process data without getting them mixed up. In this case the HARQ process ID could be included along with the identifier for the identity of the device.

Figure 3:
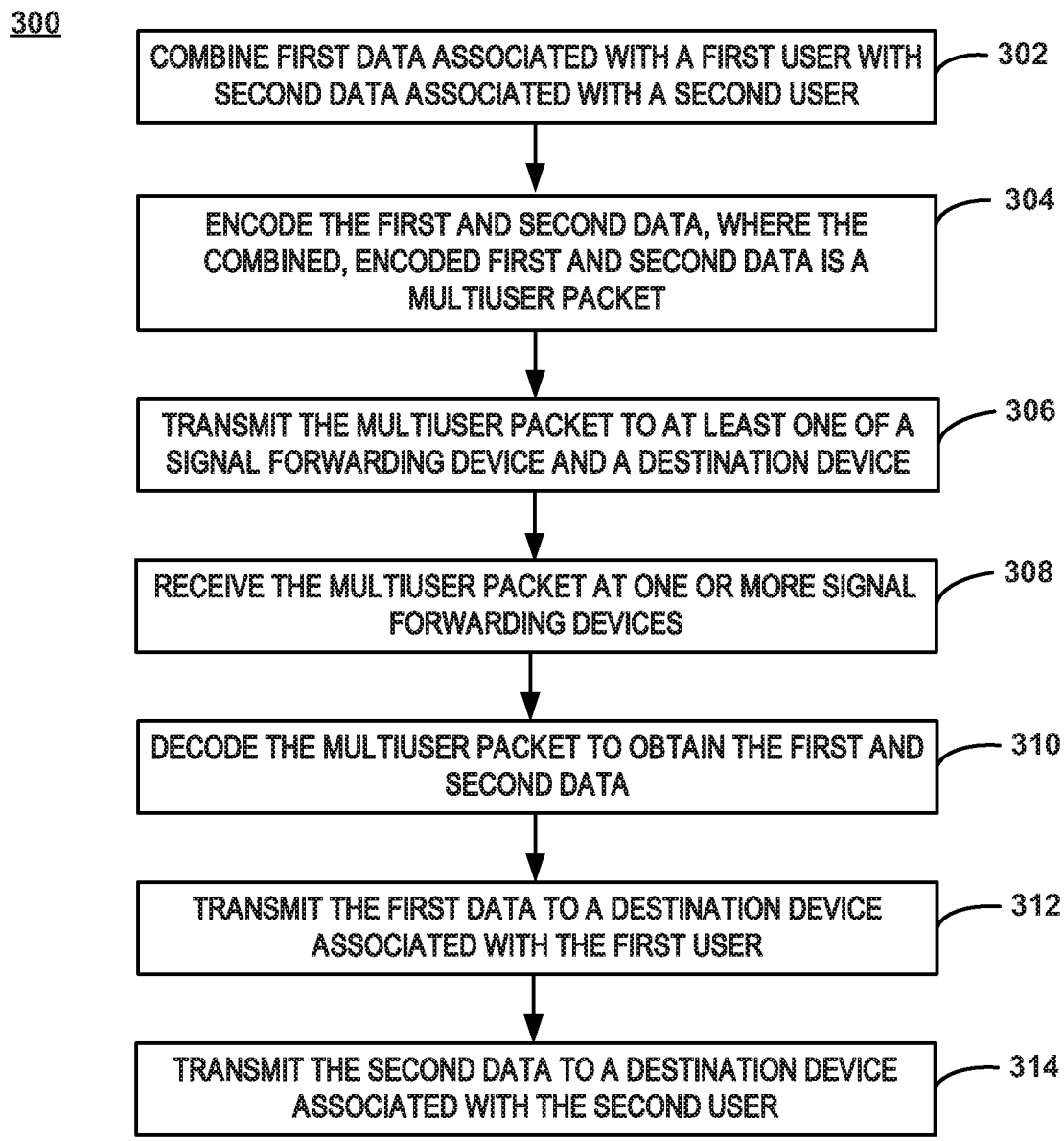
FIG. 3 is a flowchart of an example of a method of transmitting a single-encoded multiuser packet.

FIG. 3 is a flowchart of an example of a method 300 of utilizing the wireless communication system of FIG. 1C to transmit a single-encoded multiuser packet. The method begins, at step 302, with combining first user data associated with a first user and second user data associated with a second user. At step 304, the first and second user data are encoded according to a first set of encoding parameters corresponding to channel conditions associated with a first communication link between the origination device 190 and the signal forwarding device 194. The first set of encoding parameters comprises a first encoding technique and/or a first encoding rate. The result of encoding the combined first and second user data with Encoder 2 is a single-encoded multiuser packet.

At step 306, the origination device 190 transmits a single-encoded received signal 192, which contains the single-encoded multiuser packet, to the signal forwarding device 194. At step 308, the signal forwarding device 194 receives the single-encoded received signal 192. At step 310, the signal forwarding device 194 decodes the single-encoded multiuser packet, using decoding parameters that correspond to the first set of encoding parameters, to obtain the first and second user data. Although not shown in FIG. 3, signal forwarding device 194 utilizes Encoder 1 to encode the first user data according to a second set of encoding parameters corresponding to channel conditions associated with a second communication link between the signal forwarding device 194 and a first destination device associated with the first user. The second set of encoding parameters comprises a second encoding technique and/or a second encoding rate. Encoder 1 also encodes the second user data according to a third set of encoding parameters corresponding to channel conditions associated with a third communication link between the signal forwarding device 194 and a second destination device associated with the second user. The third set of encoding parameters comprises a third encoding technique and/or a third encoding rate.

At step 312, the signal forwarding device 194 transmits a first single-encoded forwarded signal 148, which contains the first user data, to a destination device associated with the first user. At step 314, the signal forwarding device 194 transmits a second single-encoded forwarded signal 148, which contains the second user data, to a destination device associated with the second user.

The destination device 114 receives either the single-encoded first or second user data and attempts to decode the received user data using decoding parameters that correspond to either the first or second set of encoding parameters, respectively. If the decoding procedure is successful, the destination device 114 will have successfully received the user data and will transmit an ACK to the signal forwarding device 194 and/or the origination device 190. If the decoding procedure is unsuccessful, the destination device 114 will transmit a NACK to the signal forwarding device 194 and/or the origination device 190.

In this regard, if the system of FIG. 1C utilizes a Hybrid Automatic Repeat Request (HARQ) process for error-correction and error-control, each ACK/NACK transmitted from the signal forwarding device 194 and the destination device 114 may include an identifier in order to identify the device that initially transmitted the ACK/NACK. In some cases, the HARQ Process ID may also be used. When using the HARQ mechanism, the receiver and the transmitter should know some information about the Process ID for each of the HARQ processes, so that the receiver can successfully track each of the HARQ process data without getting them mixed up. In this case the HARQ process ID could be included along with the identifier for the identity of the device.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A method comprising:
combining first data associated with a first user with second data associated with a second user;
encoding the first data and the second data, where the combined, encoded first data and second data is a multiuser packet, wherein encoding the first data and the second data comprises
encoding the first data, according to a first set of encoding parameters corresponding to channel conditions associated with a first communication link between a signal forwarding device and a first destination device associated with the first user, and
encoding the second data, according to a second set of encoding parameters corresponding to channel conditions associated with a second communication link between the signal forwarding device and a second destination device associated with the second user, and
wherein the combining, which occurs after encoding the first data and encoding the second data, yields a single-encoded data block;
encoding the single-encoded data block, according to a third set of encoding parameters corresponding to channel conditions associated with a third communication link between an origination device and the signal forwarding device, to generate a dual-encoded multiuser packet; and
transmitting the multiuser packet to the signal forwarding device configured to decode the multiuser packet to obtain the first data and the second data.

2. The method of claim 1, wherein the first user and the second user have similar Quality of Service (QoS) requirements.

3. The method of claim 1, wherein the transmitting comprises:
transmitting the multiuser packet to a signal forwarding device that
serves a first destination device associated with the first user, and
serves a second destination device associated with the second user.

4. The method of claim 3, further comprising:
decoding, by the signal forwarding device, the multiuser packet to obtain the first data and the second data;
transmitting, by the signal forwarding device, the first data to the first destination device; and
transmitting, by the signal forwarding device, the second data to the second destination device.

5. The method of claim 1, further comprising:
transmitting the multiuser packet to another signal forwarding device that serves a second destination device associated with the second user,
wherein the transmitting the multiuser packet to a signal forwarding device configured to decode the multiuser packet to obtain the first data and the second data comprises transmitting the multiuser packet to a signal forwarding device that serves a first destination device associated with the first user.

6. The method of claim 5, further comprising:
decoding, by the signal forwarding device, the multiuser packet to obtain the first data;
transmitting, by the signal forwarding device, the first data to the first destination device;
decoding, by the another signal forwarding device, the multiuser packet to obtain the second data; and
transmitting, by the another signal forwarding device, the second data to the second destination device.

7. The method of claim 1, further comprising:
receiving the dual-encoded multiuser packet at the signal forwarding device;
decoding, by the signal forwarding device, the dual-encoded multiuser packet, using decoding parameters that correspond to the third set of encoding parameters, which yields a single-encoded multiuser packet, which has a first portion that is encoded according to the first set of encoding parameters and a second portion that is encoded according to the second set of encoding parameters; and
transmitting, by the signal forwarding device, at least one portion of the single-encoded multiuser packet to at least one destination device.

8. The method of claim 1, wherein the multiuser packet is transmitted to the signal forwarding device, which does not decode the multiuser packet, and wherein the signal forwarding device transmits the multiuser packet to a destination device.

9. The method of claim 8, wherein the destination device decodes the multiuser packet in order to obtain the first data.

10. A wireless communication system comprising:
an origination device comprising:
circuitry configured to:
encode first data associated with a first user, according to a first set of encoding parameters corresponding to channel conditions associated with a first communication link between a signal forwarding device and a first destination device associated with the first user, to generate first single-encoded data,
encode second data associated with a second user, according to a second set of encoding parameters corresponding to channel conditions associated with a second communication link between the signal forwarding device and a second destination device associated with the second user, to generate second single-encoded data,
combine the first and second single-encoded data to generate a single-encoded data block, and
encode the single-encoded data block, according to a third set of encoding parameters corresponding to channel conditions associated with a third communication link between the origination device and the signal forwarding device, to generate a dual-encoded multiuser packet, and a transmitter configured to transmit the dual-encoded multiuser packet.

11. The wireless communication system of claim 10, further comprising:
a signal forwarding device comprising:
a receiver configured to receive the dual-encoded multiuser packet,
circuitry configured to decode the dual-encoded multiuser packet, using decoding parameters that correspond to the third set of encoding parameters, which yields a single-encoded multiuser packet, which has a first portion that is encoded according to the first set of encoding parameters and a second portion that is encoded according to the second set of encoding parameters, and
a transmitter configured to
transmit the first portion of the single-encoded multiuser packet to the first destination device associated with the first user, and
transmit the second portion of the single-encoded multiuser packet to the second destination device associated with the second user.

12. The wireless communication system comprising of claim 11, wherein the first destination device comprises:
a receiver configured to receive the first portion of the single-encoded multiuser packet, and
circuitry configured to decode, using decoding parameters that correspond to the first set of encoding parameters, the first portion of the single-encoded multiuser packet, and
wherein the second destination device comprises:
a receiver configured to receive the second portion of the single-encoded multiuser packet, and
circuitry configured to decode, using decoding parameters that correspond to the second set of encoding parameters, the second portion of the single-encoded multiuser packet.

13. A wireless communication device comprising:
circuitry configured to:
encode first data associated with a first user, according to a first set of encoding parameters corresponding to channel conditions associated with a first communication link between a signal forwarding device and a first destination device associated with the first user, to generate first single-encoded data,
encode second data associated with a second user, according to a second set of encoding parameters corresponding to channel conditions associated with a second communication link between the signal forwarding device and a second destination device associated with the second user, to generate second single-encoded data,
combine the first and second single-encoded data to generate a single-encoded data block, and
encode the single-encoded data block, according to a third set of encoding parameters corresponding to channel conditions associated with a third communication link between the origination device and the signal forwarding device, to generate a dual-encoded multiuser packet, and
a transmitter configured to transmit the dual-encoded multiuser packet.

* * * * *